United States Patent [19]

Dolev et al.

[11] Patent Number: 4,569,015
[45] Date of Patent: Feb. 4, 1986

[54] METHOD FOR ACHIEVING MULTIPLE PROCESSOR AGREEMENT OPTIMIZED FOR NO FAULTS

[75] Inventors: Danny Dolev, Jerusalem, Israel; Hovey R. Strong, Hollister, Calif.

[73] Assignee: International Business Machines Corporation, Armonk, N.Y.

[21] Appl. No.: 485,573

[22] PCT Filed: Feb. 9, 1983

[86] PCT No.: PCT/US83/00171
§ 371 Date: Apr. 13, 1983
§ 102(e) Date: Apr. 13, 1983

[87] PCT Pub. No.: WO84/03158
PCT Pub. Date: Aug. 16, 1984

[51] Int. Cl.[4] .............................................. G06F 3/00
[52] U.S. Cl. ................................................... 364/200
[58] Field of Search ... 364/200 MS File, 900 MS File, 364/300 MS File; 371/4, 5

[56] References Cited
U.S. PATENT DOCUMENTS

| 4,030,072 | 6/1977 | Bjornsson | 364/200 |
| 4,174,536 | 11/1979 | Misunas et al. | 364/200 |
| 4,276,594 | 6/1981 | Morley | 364/200 |
| 4,325,120 | 4/1982 | Colley et al. | 364/200 |
| 4,354,225 | 10/1982 | Frieder et al. | 364/200 |
| 4,418,384 | 11/1983 | Holtey et al. | 371/5 |

Primary Examiner—Raulfe B. Zache
Assistant Examiner—David Y. Eng
Attorney, Agent, or Firm—R. Bruce Brodie

[57] ABSTRACT

An originating processor broadcasts a value in a message with its unforgeable signature to all n active processors, including itself. Receiving processors in the network pass such a message on with their own unforgeable signatures to all active processors, including themselves. If the number of signatures and phases is the same at each processor after the first two successive passings, then agreement as to the value with no fault is indicated, otherwise if after two passings, (t+1) signatures have been collected, then these are signed and sent in the third passing, and in any case, each processor continues the steps of repeatedly sending messages when received, and appending its signature until t+2 passings have occurred. At that time, a processor will agree to the value if at least (t+1) signatures append the message, otherwise a default value is adopted, t (n/2) being a reliability measure.

4 Claims, 5 Drawing Figures

METHOD FOR ACHIEVING MULTIPLE PROCESSOR AGREEMENT OPTIMIZED FOR NO FAULTS

TECHNICAL FIELD

This invention relates to a network whose processor nodes exchange information in synchronized phases, and more particularly to methods for achieving agreement among the processors, either to execute a task distributed among them, or not at all, even in the presence of detected faulty processors.

BACKGROUND

It is well appreciated that a computation may consist of concurrently executing tasks distributed over a network of CPUs. Indeed, Hodgkinson, U.S. Pat. No. 4,274,139, entitled "Digital Telecommunications Network Having Improved Data Processing Systems", issued on June 16, 1981, describes a system in which a local CPU executing one task ships another function to another CPU for remote execution, and accepts the output results from the remotely processed task. Likewise, Yost, in copending application Ser. No. 06/459,746, filed on Jan. 21, 1983, entitled "Controlling Multiple Distributed Computations in a Multi CPU Environment from a Single Port", discloses a method for dialoging with distributed concurrently executing tasks of a computation through a single physical port. Among the facilities utilized are those permitting a pass-through, that is, allowing users at one site to log on to a CPU at another, and the transferring of files.

A computation may consist of a number of concurrently executing tasks involving accessing, modifying, and restoring information, either locally or at remotely networked CPUs. This may require coordination, simultaneity of action, or similarity of end effects or results. Examples are diverse such as the debit/credit of distributed accounts by the same amount, or using the same starting clock values. The common attribute of interest is that multiple asynchronous processors use and rely upon an information value originated by one of their number. The quest is to determine whether the value received was the original one sent. Two classes of protocols have been devised to treat this problem. These are respectively, multi-phase commit/abort protocols, and Byzantine Agreements.

Both commit/abort protocols and Byzantine Agreements involve the synchronized phase exchange of messages among the networked CPU's (nodes) and their evaluations at the respective nodes for the purpose of eventually guaranteeing uniform commitment of transactions at all nodes visited by a transaction. There are differences in emphasis among protocol types. For example, Byzantine Agreement assumes that each active node knows the identity of all of the other active nodes in the network, and that there is a direct coupling therebetween. Further, Byzantine Agreement tries to converge agreement within a fixed period of time at a high message overhead. In contrast, multiphase commit protocols, as described by Gray, "Operating Systems, An Advanced Course", Springer Verlag, 1978, focuses on a hierarchy of tasks in which awareness of nodes by any individual node is limited to immediate subordinates.

Multiphase commit protocols can tolerate many lost messages. They cannot, however, tolerate even single instances of failure of the coordinating processor node. This node selectively sends a "commit" to some networked processors and "abort" the transaction to others. In contrast, Byzantine protocols require more messages on the average, and tolerate a limited number of node/link failures, but the failures can be of a variety of types. Thus, when the object of the protocol is to secure guaranteed broadcast, the tradeoff is between message overhead, and reliability of the guarantees.

Also, Skeen, "Non-Blocking Commit Protocols", ACM SIGMOD Conference, 1981, at pp133-142, describes multiphase commit protocols to reduce blocking possibility in the event of failure. Where the computational objective is the concurrent updating of a replicated database, it can be shown that the message traffic between the classes of protocols is of the same magnitude.

Pease et al, "Reaching Agreement in the Presence of Faults", 27 Journal of the ACM, pp228-34, April 1980, defines Byzantine Agreement as a method for achieving consistency and agreement among asynchronous processors in a network having means of exchanging information in synchronized phases, even where some of the processors may be faulty. Relatedly, Lamport, "The Byzantine Generals' Problem", #4 ACM Transaction on Programming Languages and Systems, pp382-401, July 1982, graphically describes the paradigm in military terms. However, as applied to a network of n processors capable of exchanging information over bidirectional links, the problem is for all of the processors to agree on the contents (value) of a message being sent by one of them in an environment containing potentially faulty processors or links. Under these circumstances, no assumption is made about the behavior of faulty components. Thus any method must cope with processors or links that could fail to relay a message as intended, or even sabotage its contents.

Byzantine Agreement (BA) is a result of a guaranteed broadcast to a set of participating processors, such that all correctly operating processors receive the same message or none does, provided that the number of faults in the system does not exceed a parameter t, which parameter characterizes the reliability of the guaranty. Characteristically, the network of possibly unreliable processors includes means for conducting several synchronized phases of information exchange. After the exchange, the processors must all agree on a value held originally by one of their number. BA is achieved when:

1. All correct processors agree on the same value, and
2. If the originator is correct, then all processors agree on its value.

Implicit in attributes (1) and (2), is that there must exist a time by which each of the processors has completed the execution of its protocol for reaching agreement, and that this time must be known by all the processors. The agreement is said to be "immediate" if all processors reach agreement in the same phase. Otherwise, the agreement is "eventual".

A protocol uses "authentication" when it is desired to prevent any processor from introducing any new value or message into the information exchange while claiming to have received it from another. Authentication protocols require a sending processor to append a signature to the message. The "signature" contains a sample portion of the message encoded such that any receiving processor can verify that the message is authentic, and that it was created by the originating processor. Also, it is assumed that no processor can forge the signature of another, that is, no processor can change the content of a message undetectably.

If a Byzantine Agreement with reliability t is impacted by fewer than t faults, how soon can the processors reach an agreement in which only f actual faults occur? The resolution of this question involves making explicit the notion of stopping. The processor is considered to have "stopped" when it has decided upon a value for agreement, and will do no further processing or relaying of messages pertaining to this agreement. When a processor has stopped with respect to a particular agreement, it conceivably could cut all of its communication links without effecting the outcome of the agreement for other processors or itself.

In the prior art, methods for achieving "immediate Byzantine Agreement" using authentication, require $t+1$ phases and $O(nt)$ messages. It will be assumed that it is art-recognized that there exist protocols requiring authentications in which the number of messages in an n processor network for achieving agreement is a small polynomial function involving the factors n and t. It is also stipulated that without authentication the results are more varied.

THE INVENTION

It is an object of this invention to devise a machine-implementable method for achieving Byzantine Agreement among active networked processors wherein the number of phases and messages required to achieve agreement are bounded, and wherein the processors exchange authenticated broadcast messages in synchronized phases. Relatedly, it is an object that the method be operable among n processors coupled in a reliable $(t+1)$-connected network where at most $t<(n/2)$ processors/links are faulty, and further wherein agreement can be achieved in $t+2$ phases. It is yet another object that the method achieve agreement within a minimum number of phases in the absence of faulty processors.

These objects are attained by a method comprising the steps of: (a) broadcasting a value message by an originating processor with its unforgeable signature to all active processors including itself; (b) each receiving processor passing such a message on and appending its own unforgeable signature thereto to all other active processors including itself; and (c) each active processor agreeing to the message value and stopping at the end of the first two message passings if every active processor has signed, obtaining unanimous support, and if the number of signatures is at least $t+1$ but not unanimous, signing and sending the message with the $t+1$ signatures, each processor not stopped by unanimous support continuing the steps of repeatedly sending messages when received, and appending its signature thereto until $t+2$ message passings having occurred, at this time either agreeing to the value if at least $t+1$ signatures append the message, or otherwise assuming a default value.

The essence of the method is to "sign and send" a received message to all active processors, including oneself. Early stopping is reached if all processors have signed (unanimous support) after the first two successive passings. Otherwise, those processors without unanimous support continue the steps of repeatedly signing and sending messages when received until $t+2$ passings have occurred. Advantageously, this method results not only in early stopping in the absence of faults, but in bounding the number of messages linearly to $O(nt)$. As to other methods in the prior art, none allows this early stopping in case of no fault when the number of participating processors is as small as $2t+1$.

DESCRIPTION OF THE PREFERRED EMBODIMENT AND INDUSTRIAL APPLICABILITY

This method assumes that all processors in a synchronous, completely and reliably-connected network, are correct most of the time. It is particularly directed to minimizing the number of phases and authenticated messages required to achieve Byzantine Agreement (a) without faulty processors, or (b) with up to t faulty processors. This embodiment includes n active processors being arranged in a reliable $(t+1)$-connected network. As used in this invention, connectedness is used in its graph theoretic sense. That is, as pointed out by Deo, "Graph Theory with Applications to Engineering and Computer Science", Prentice Hall, Inc., Englewood Cliffs, N.J., copyright 1974, page 21, a graph is connected if one can reach any vertex from any other vertex by traveling along the edges. More formally, a graph G is said to be connected if there is at least one path between every pair of vertices in G. Transliterating for this instance, there exist at least t nonintersecting paths coupling any active processor with any other active processor in the network. Also note that t, as previously mentioned, is a parameter related to the number of faults that are to be tolerated in a network of N nodes. In any event, number of faults t must be less than half the number of nodes constituting the network.

Byzantine Agreement and Synchronized Phase Information Exchange

The ensuing discussion proceeds on the assumption that the network of interest consists only of active processors, and that message traffic can be managed in part by partitioning processors into active and passive. Assume that a source s sends (originates) a value v at phase 1 to all "active" processors with its unforgeable signature. In this regard, a "phase" is taken to be a directed graph whose nodes are processors and whose edges are represented by messages transmitted between node pairs. Also, "phase" is defined as the time difference for a sender to transmit, and all processors to receive the message value v, process said message, and resolve their next stop.

If exactly (v)s is received by the pth processor, then the pth processor signs (adds) its signature ((v)s)p and sends the signed messages to all processors, including itself, during phase 2. Also during this phase, if exactly ((v)s)p is received by the qth processor from each processor p, including itself, and no other messages during phase 2, then the qth processor stops further participation in the method, and adds value v to its list of committed values. "Early stopping" takes place in phase 2 when the signed value v is exactly received from all processors, including itself. Absent this constraint, the qth processor would have to wait until phase (t+2) before the value v could be added to its list of committed values.

If a value other than v was received by the qth processor, it would be concluded that the sender was faulty, and the qth processor would go to its default value.

Special Message Syntax

At this point let us define a special message syntax:
1. The set of values v is contained in the set of atomic messages.
2. A label is either an atomic message, an authentication, or a sequence of labels.
3. An authentication is a label of the form (label a)p, where p is the name of a processor and label a is a label.
4. A sequence of labels is a label of the form label a, label b, where label a and label b are labels. Note, that (a,b,c)p is not the same as (a)p(b)p(c).
5. A label a is part of a label b if either a=b or if there is a label c and a processor p, such that a is part of c and b=c(p), or there are labels c and d, such that b=c,d and a is part of c or d.
6. A message is a label with no commas.

Low Support and Dense Messages

A processor is said to have "low support" for value v if for each of t+1 processors p it has received as part of a message, an authentication signed by p with v as its only atomic message part. A message received by a processor at any given phase is said to be "dense" if its only atomic message part is a value, all its other parts being authentications, and v distinct signatures of processors appear in the message. Illustratively, let p, q, r, and s be processors, let v be a value, and let t=2. It follows that (((v)s)p)q is a "dense" message if received at phase 3, but not at phase 4. Relatedly, the sequence ((v)s)p, ((v)s)q is "low support" for v because it includes (t+1)=3 distinct signatures on messages with atomic part v. In general, a dense message received at phase k has the form ( ... ((v)p/1/ ... )p/k/. Low support will require t messages at phase 2. Later, the number of messages may be as large or as small as one dense message after phase t.

To restate the notions of denseness and low support:
dense message received at phase q=atomic message part (value v only) plus authentications from q distinct processors.

low support=$q \geq (t+1)$ distinct signatures received in dense messages with only atomic part value v.

If a processor has not stopped at phase 2, and if it has low support for value v, then the processor (1) adds v to its list of committed values, and then (2) if v is one of the first 2 values, then enough messages, including dense messages, must be sent to convey low support for v. Lastly, if a processor is not otherwise stopped, then it must stop after phase t+2.

The method of this invention is optimized for the case of no faults in that it permits a processor receiving unanimous support to stop at phase 2, while in the presence of faults, processors without unanimous support must wait during the interval between phase 2 and phase t+2 for dense messages with low support, add values conveyed to the list of their committed values, and transmit dense messages to all corresponding to the first two such values received.

Relativistic Effects and Local Clocking

The network of nodes is of the single sender/single receiver type in which there exists pairwise communications over a message interface. As previously discussed, the term "phase" characterizes message transmission among node pairs, and roughly corresponds to a "time interval". A relativity problem arises from the fact that time is not exactly the same between nodes. For a detailed discussion see Lamport, "Time, Clocks, and the Ordering of Events in a Distributed System", 21 Communications of the ACM, pp558-565, July 1978. Practically speaking, this means that if a system can be synchronized by a global clock, then the term "phase" is synonymous with time interval.

The Local Node Execution Environment

As a preliminary, the method of this invention is executable upon a computing system of the type including one or more CPUs, each having a main store, input-/output channel, control unit, direct access storage devices, and other I/O devices coupled thereto. Such a system is described in Amdahl et al, U.S. Pat. No. 3,400,371, issued Sept. 3, 1968, and entitled "Data Processing System". The Amdahl system includes as a resource, all of the facilities of either the computing system or of an operating system running thereon which are required for the execution of a process. Typical resources include a main store, I/O devices, the CPU, data sets, and control or processing programs. Furthermore, such systems are capable of "multi-programming". This pertains to the concurrent execution of two or more processes by a computing system, and can be managed on a computer running under an IBM System/360 operating system, as described in IBM publication GC28-6646, July 1973, and listed in IBM System/360 bibliography, GA22-6822. Networks of asynchronously operating CPUs are described in Fitzgerald, U.S. Pat. No. 3,940,743, "Interconnecting Unit for Independently Operable Data Processing Systems", issued Feb. 24, 1976, and Antonacco et al, U.S. Pat. No. 4,223,380, "Distributed Multiprocessor Communication System", issued Sept. 16, 1980.

Flow Diagram Depiction of Method Execution

Figure 2:
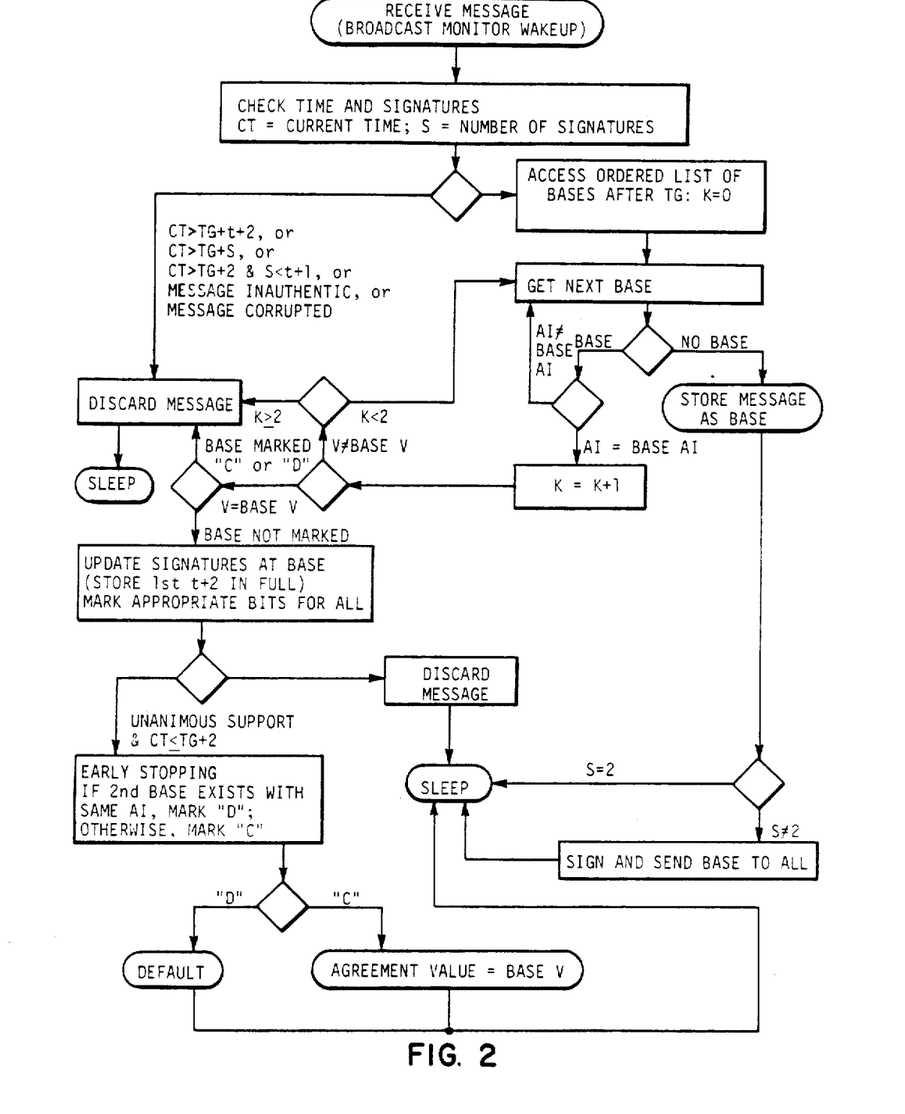
FIGS. 2 and 4 are respective flow diagrams of the broadcast and Byzantine monitors, while FIG. 3 refers to the communication of wakeup times between the broadcast and Byzantine monitors.
Figure 4:
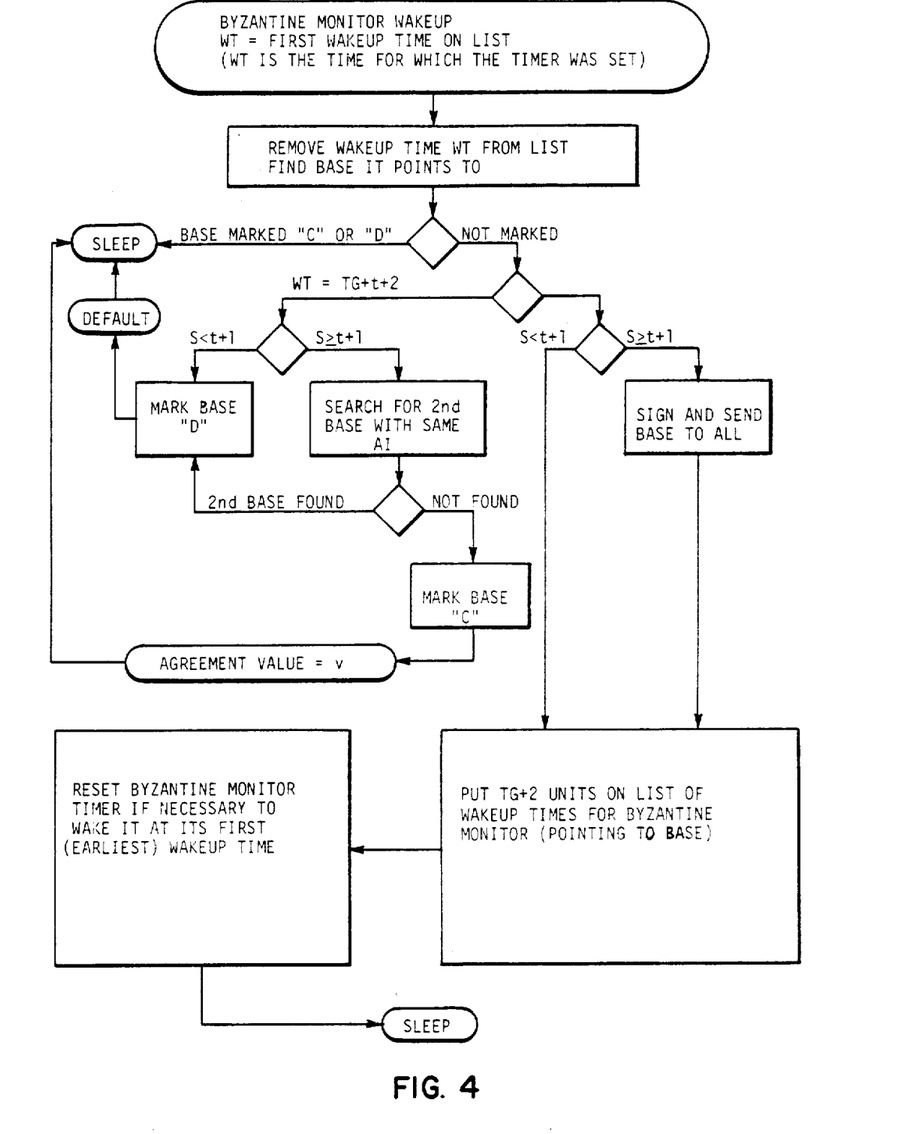

Each processor node in a network includes a broadcast monitor facility shown in FIG. 2, and a Byzantine Agreement monitor set out in FIG. 4. The broadcast monitor is the general communicating message processor for a node. It also includes the facility for resolving Byzantine Agreement where no fault occurs with early stopping, i.e., by phase 2. In contrast, the Byzantine Agreement monitor resolves agreement for other than early stopping.

Figure 1:
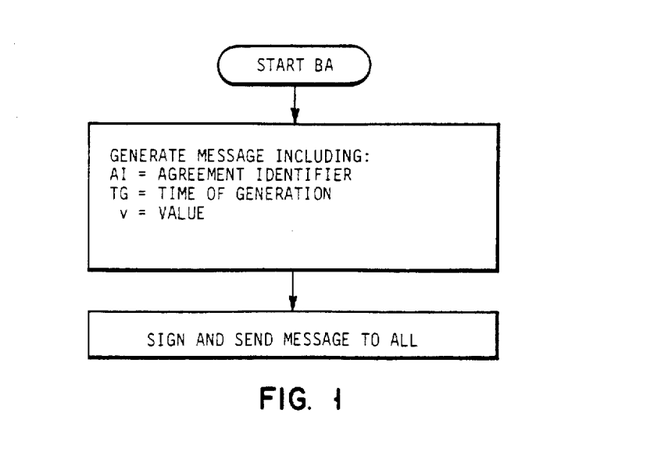
FIG. 1 is a flow diagram of Byzantine Agreement invocation.

Referring now to FIG. 1, there is set out a message syntax. This means that at the start of the agreement process, when a Byzantine Agreement is invoked, a message is generated that includes an agreement identifier (AI), a time of generation (TG), and a value (v). (It should be emphasized that the object of Byzantine Agreement is to ascertain agreement as to what a processor originally said.) The message is then signed and sent to all other active processors since all the other active participants in the network are known. Further, for purposes of completeness, the "signature" could be an encrypted message, or one or more appended ECC bytes.

Attributes of Monitors

As may be recalled, a monitor is a collection of procedures bound to a computing resource. It is responsible for allocating the resource and for controlling references to it. Each resource in the system generally has a specific monitor. Thus, there is a memory monitor, a communications (broadcast) monitor, and a CPU monitor. Each monitor has exclusive access to any tables or other structures containing information about the resource for which it is responsible. Involved with the monitors is a "mailbox". A mailbox is a queue associated with a receiver that can record messages from more than one sending process.

The Broadcast Monitor

Referring now to FIG. 2, there is shown a flow diagram of the broadcast monitor according to this invention. This monitor records initial time in a designated logical register. The monitor procedure is built around first accessing and locking the broadcast mailbox, and then using a repeating procedure (loop), processing each message in turn until the queue of messages from external sources defining the mailbox is exhausted. At this point, the mailbox is unlocked and awaits the arrival of new messages. Each message is formatted with a broadcast information block imbedded therein. The block includes status information to identity, time of generation, and a commit value. There are several loops to be generally noticed. The first loop relates to discarding all messages that are either corrupted, non-authentic, or where the current time exceeds the time of message generation by predetermined amounts. These amounts are the time unit equivalent of the number of signatures. Upon the messages being discarded, the monitor returns to a "sleep" state. Given that the messages are authentic, not corrupted, and the current time is less than the time of generation plus a predetermined increment, then access is made of a data structure consisting of an ordered list of objects called "bases". A "base" is the first received message of any agreement. Also, a running variable K is set equal to zero for counting the number of detected bases in the messages. The bases are ordered by their time of generation (TG), so the next step of fetching the next base means obtaining the next largest magnitude TG from the list. If there is no "next base" this first process message is stored as a base in this ordered list data structure.

Returning to the point at which we have obtained the next base, and assuming such a base has been found, it is necessary to compare the identity of the message being processed with that of the base. If these are not equal, then the next base is fetched and compared. The ordered list will be scanned until either no base is found, or a base is found which has an agreement identifier the same as that of the message being processed. The counter is unit-incremented, i.e., $K = K + 1$.

Next, if the base has been found, then a test is made as to whether the value in the base is equal to the value v in the message. If the value in the message being processed and that of the base are not the same, then the bases are rescanned if K is less than 2. Note, only two bases need be maintained in this list. This is premised on the observation that the mismatch between values v between a current message and one base is sufficient to indicate sender fault. That is, if the sender sends two messages with different values under the same agreement identifier, then a fault is indicated. If bases have been looped through two or more times, that is $K = \geq 2$, and the message and base values mismatch, then the message is discarded.

Suppose the currently processed message value v is the same as the base value. If the base is marked with a "c" or a "d" it is discarded. This means that no further message processing or Byzantine Agreement need be made. It is indicative that the agreement has already been resolved.

If the base is not marked, the signatures on the message will be used to update the signatures at the base. That is, the first $t + 2$ signatures are stored in full, and appropriate bits are marked for all of them. If the current time CT is less than time of generation plus 2 units, then we are within the early stopping time, i.e., within phase 2. If all signatures have been received there is unanimous support. On the other hand, if not all signatures were received, then the message is discarded and the monitor returns to the "sleep" state.

Returning now to processing during early stopping. The bases are then checked to see if a second base exists having the same agreement identifier as the message and base being processed. If it does, then the base is marked with a "d", returned to the list, and the processor adopts a default value. Otherwise the base is marked with a "c", returned to the list, and base value v is adopted as the agreement value. In this implementation, the default value contains the information that the sender is faulty. After either marking a base as "c" or "d", the monitor assumes a "sleep" state. This completes the process for early stopping.

Suppose then, after cycling through the data structure, there is no base, then the message being processed is stored as the base. Also, if the number of signatures on that message is two, then the monitor is immediately returned to the "sleep" state. On the other hand, if the number of signatures is other than two, the processor signs the message and broadcasts it to all other processors, including itself. After this, the monitor goes to sleep.

The broadcast monitor processes each message in turn, discarding messages that do not fit the time authentication or corruption criteria for establishing a base. The only place where the monitor resolves the agreement is in the case of early stopping. Asynchronous to the activity of the broadcast monitor is the activity of the Byzantine Agreement monitor whose purpose it is to resolve agreements other than those of early stopping. The communication between the broadcast Byzantine monitors is by way of modifying the base and storing it.

Figure 3:
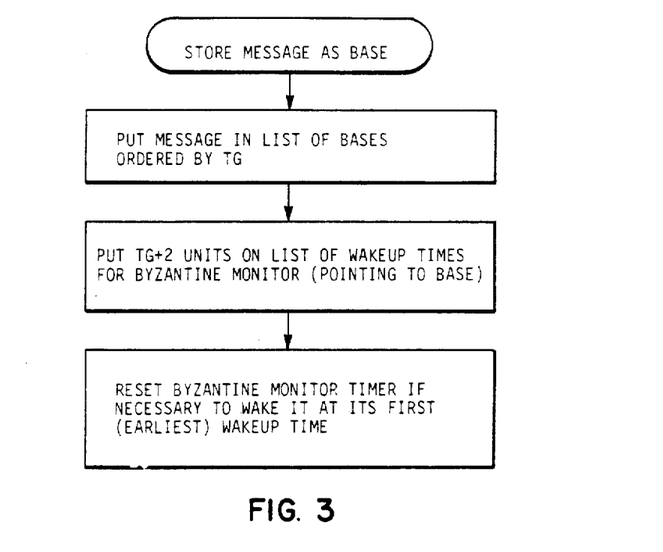

Referring now to FIG. 3 wherein a message is stored as a base, the time of generation plus 2 units is placed in the list of wakeup times pointing to the base for the Byzantine monitor. The timer for the Byzantine monitor is reset if necessary to wake the monitor at the earliest of its wakeup times.

The Byzantine Monitor

Referring now to FIG. 4, there is shown a flow diagram for the Byzantine monitor. This monitor is operatively responsive to two ordered lists. When this monitor is invoked, it accesses and locks the broadcast mailbox and obtains the current time as well as locking the ordered lists. In this regard, a first list is an ordered list of wakeup times corresponding to either $TG + 2$ or $TG + t + 2$ for some bases, while the other is an ordered list of still-active bases. The contents of these lists are processed by a loop. Every time a message is stored as a base, the time TG+2 units is stored as a wakeup time for the Byzantine monitor. Associated with that object on that list is a pointer to the base stored on the other list. When the operating system responsive to the wakeup time invokes the Byzantine monitor, the time is removed from the list and access is made to the associated base. This base is either marked "c" or "d", or not marked at all. If it is marked then the monitor returns to the "sleep" state. If the base is "not marked" then the wakeup time WT is compared with the time of generation of the base TG. If $WT=TG+2$, then if there is low support (t+1 signatures) at the base, the base is signed and sent to all processors, even if previously sent. In any event, a new wakeup time of TG+t+2 is put on the list. Also, the monitor returns to "sleep" after resetting its timer if this is necessary to wake up at the earliest "wakeup time". If $WT=TG+t+2$, then the number of signatures accompanying the base message is examined to ascertain whether it is sufficiently supported. That is, if the number of signatures s is less than (t+1), it is deemed insufficiently supported, and the base is marked "d". The processor resolves against agreement and assumes a default value. In turn, the monitor returns to the "sleep" state. On the other hand, if $s \geq (t+1)$, then a search is made for a second base in the list having the same identifier. If this base is found, then it is marked "d", the processor resolves against agreement by assuming the default value, and the monitor returns to the "sleep" state. If there is no second base with the same identifier, then the base is marked "c" and the processor assumes the agreement value v of the base. After this, the monitor returns to the "sleep" state.

The function of the Byzantine monitor is to resolve agreements at time TG+(t+2) time units. Thus, the broadcast monitor resolves for or against the agreement within the first two phases, while the Byzantine monitor asynchronously resolves for or against agreement at phase t+2. By the terms of this method, it is guaranteed that every active processor will either reach the agreement value or the default value within either two phases, in the absence of fault, or t+2 phases where the number of faults t is less than (n/2).

Two-Phase Commit Protocols as an Instance of the Byzantine Agreement Method of the Invention The method of this invention may be applied to a two-phase commit protocol when it is desired that processors guarantee agreement on either committing or aborting the processing of a transaction within a predetermined time. Thus, there exists an upper bound $\tau$ for the time taken for a processor to respond to a message according to the method, and for that response to be received by yet another processor in the synchronized (t+1)-connected network of processors. As a matter of definition, a (t+1)-connected network means that any two points in the network have t+1 disjoint paths.

If a processor anticipates a value, and then does not receive it within time $\tau$, it concludes that either the sending or receiving processor is faulty. The protocol for applying the method to two-phase commit requires the following steps:

(a) designating one of the nodes as a transaction coordinator and broadcasting a "prepare-to-commit" at time t (on its clock) message to all participating processors;

(b) each processor responding to the "prepare-to-commit" message by logging either a "prepared" record and voting "yes", or by aborting and voting "no";

(c) if, by time $t+2\tau$, the transaction coordinator has received "yes" from all network participants, then broadcasting the event "commit" using the Byzantine Agreement protocol, or broadcasting "abort", also using said Byzantine protocol; and (d) if, by time $t+6\tau$ on its clock, a processor, having not decided to "commit", resolves to "abort", i.e., adopt the default value.

A Worst Case Scenario

Figure 5:
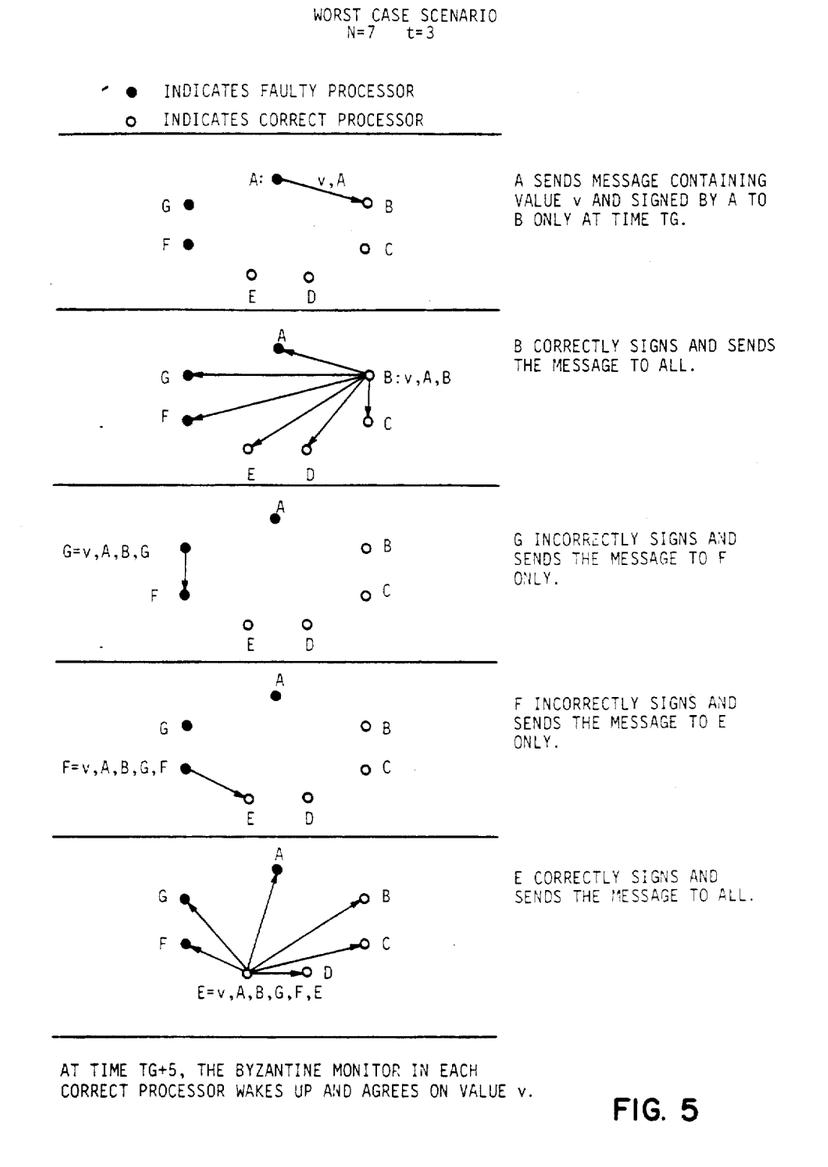
FIG. 5 sets out a sign-and-send message scenario among seven networked processors where three may be faulty.

Referring now to FIG. 5, there is shown a message communication pattern along directed edges among the nodes of a graph of networked CPUs. In this case n=7CPUs of which t=3 are faulty. The black nodes indicate a faulty processor, while a white node indicates a correct processor. In the first phase, A faultily sends a message containing value v and signed by A to B only at time TG. B correctly signs the message and sends the message to all nodes during the second phase. During a third phase, G incorrectly signs and sends the message to F only. During phase 4, F likewise incorrectly signs the message and sends it to E only. Lastly, E correctly signs the message and sends the message to all. Interestingly, the message is not well-supported until phase 5 in that it needs at least t+1 signatures. This does not occur until phase 4. In order for the message to be signed and transmitted from nodes G and F, both nodes conceivably acted in collusion. It is only in phase 4 that a node appends the (t+1)=4 signature in a message sent to E only. If F had indeed sent the message to all nodes instead of just one, then agreement could be resolved at phase TG+4.

While the invention is particularly described with reference to a preferred embodiment, it will be further understood by those skilled in this art, that various changes in the form and details may be made therein without departing from the spirit and scope of the invention. Illustratively, the phases, although described as discreetly occurring, may well be in a nested relationship. Moreover, if the network is completely connected, where each node is linked to every other node, and at least (t+1)-connected, then the invention without modification will tolerate undetected failures of nodes/links up to the bound t (n/2).

Advantageously, this invention requires immediate stopping at that point in time (phase 2) when the base contains all signatures of active processors. Absent early stopping, a processor has to wait until phase t+2 with at least t+1 signatures, before the value v could be added to its list of committed values. If a value other than v was received, the processor would conclude that the sender was faulty, and the processor would adopt the default value. It is considered that evidence of a fault is the non-satisfaction of immediate stopping. That is, if after two phases of processing a processor has not stopped, then one of the nodes is faulty somewhere.

We claim:

1. A method for achieving agreement among n processors to the same value arising out of a series of message passings originated by one of said processors, the processors being arranged in a reliable (t+1)-connected network, the number of message passings required to achieve agreement being small in the absence of faults, and having an upper bound where the number of faults t is less than (n/2), comprising the steps of:

(a) broadcasting a value message by an originating processor with its unforgeable signature to all active processors including itself during a first message passing;

(b) each receiving active processor passing such a message on and appending its own unforgeable signature thereto to all other active processors including itself during a second message passing; and (c) each active processor agreeing to the message value and stopping at the end of the first two message passings if every active processor has signed, and (1) if the number of signatures is at least $(t+1)$, but not unanimous, signing and sending the message with the $(t+1)$ signatures, and (2) each processor not stopped by receiving a message having a unanimous number of signatures, thereby continuing the steps of:

(2.1) repeatedly sending messages when received, and (2.2) appending its signature thereto until $(t+2)$ message passings have occurred, at this time either agreeing to the value if at least $(t+1)$ signatures append the message, or otherwise assuming a default value.

2. A method according to claim 1, wherein each generated message includes an agreement identifier (AI), a time of generation (TG), a message value (v) and at least one appended signature.

3. A method according to claim 1, wherein each processor includes at least broadcast and Byzantine Agreement monitors.

4. A method according to claims 1, 2, and 3, wherein each processor executing its broadcast monitor is responsive to messages for the first two passings, and includes the further steps of:

ascertaining the current time (CT) and number of signatures (s) of the message being processed;

comparing CT with TG and either discarding the message if CT is greater than TG plus a predetermined minimum, or accessing an ordered list of bases;

ascertaining whether the message agreement identifier is the same as that of a prestored message termed a base in the list, if not, and if twice determining that the message value is not the same as the base value, discarding said message, or in the event that there is no base in the list, storing the current message as the base; upon the current message being stored as the base, determining whether the number of signatures is not equal to two, signing and sending the base to all other processors, or, if the number of signatures is two, terminating the monitor execution;

upon the current message value v being the same as the base value, determining whether the base has been marked, and if so, marking it "discard", otherwise updating the signatures at the base and storing in the list; if the number of signatures in unanimous, and CT is less than TG+2, marking the base as being agreed and adopting the agreement value, otherwise marking the base distinctively and adopting the default value.

* * * * *